United States Patent [19]
Stern

[11] Patent Number: 6,136,283
[45] Date of Patent: Oct. 24, 2000

[54] REMOVAL OF NITROGEN OXIDE FROM GAS STREAMS

[75] Inventor: Sidney Simon Stern, Highland Park, N.J.

[73] Assignee: The BOC Group, Inc., Murray Hill, N.J.

[21] Appl. No.: 08/979,896

[22] Filed: Nov. 26, 1997

Related U.S. Application Data

[63] Continuation-in-part of application No. 08/679,416, Jul. 8, 1996, abandoned.

[51] Int. Cl.⁷ .............................. C01B 21/00; C01B 3/04; C01B 21/20; B01J 8/00
[52] U.S. Cl. ...................... 423/235; 423/237; 423/239.1; 423/239.2
[58] Field of Search .................. 423/239.1, 237, 423/239.2, 235

[56] References Cited

U.S. PATENT DOCUMENTS

| | | | |
|---|---|---|---|
| 4,130,575 | 12/1978 | Jern | 260/449 M |
| 4,248,841 | 2/1981 | Benedick | 423/210 |
| 4,478,808 | 10/1984 | Matros et al. | 423/522 |
| 4,877,592 | 10/1989 | Matros et al. | 423/245.1 |
| 5,366,708 | 11/1994 | Matros et al. | 423/210 |
| 5,401,479 | 3/1995 | Matros et al. | 423/239.1 |

*Primary Examiner*—Elizabeth D. Wood
*Attorney, Agent, or Firm*—Philip H. Von Neida; Salvatore P. Pace

[57] ABSTRACT

Temperature rise during the exothermic reduction of nitrogen oxides contained in a carbon dioxide-rich gas stream to nitrogen by contacting the gas stream with ammonia in a reactor containing a reduction catalyst is controlled by recycling a portion of the gaseous effluent from the reactor to the gas stream prior to its introduction into the reactor, thereby cooling the reactor contents without diluting the carbon dioxide in the effluent.

12 Claims, 1 Drawing Sheet

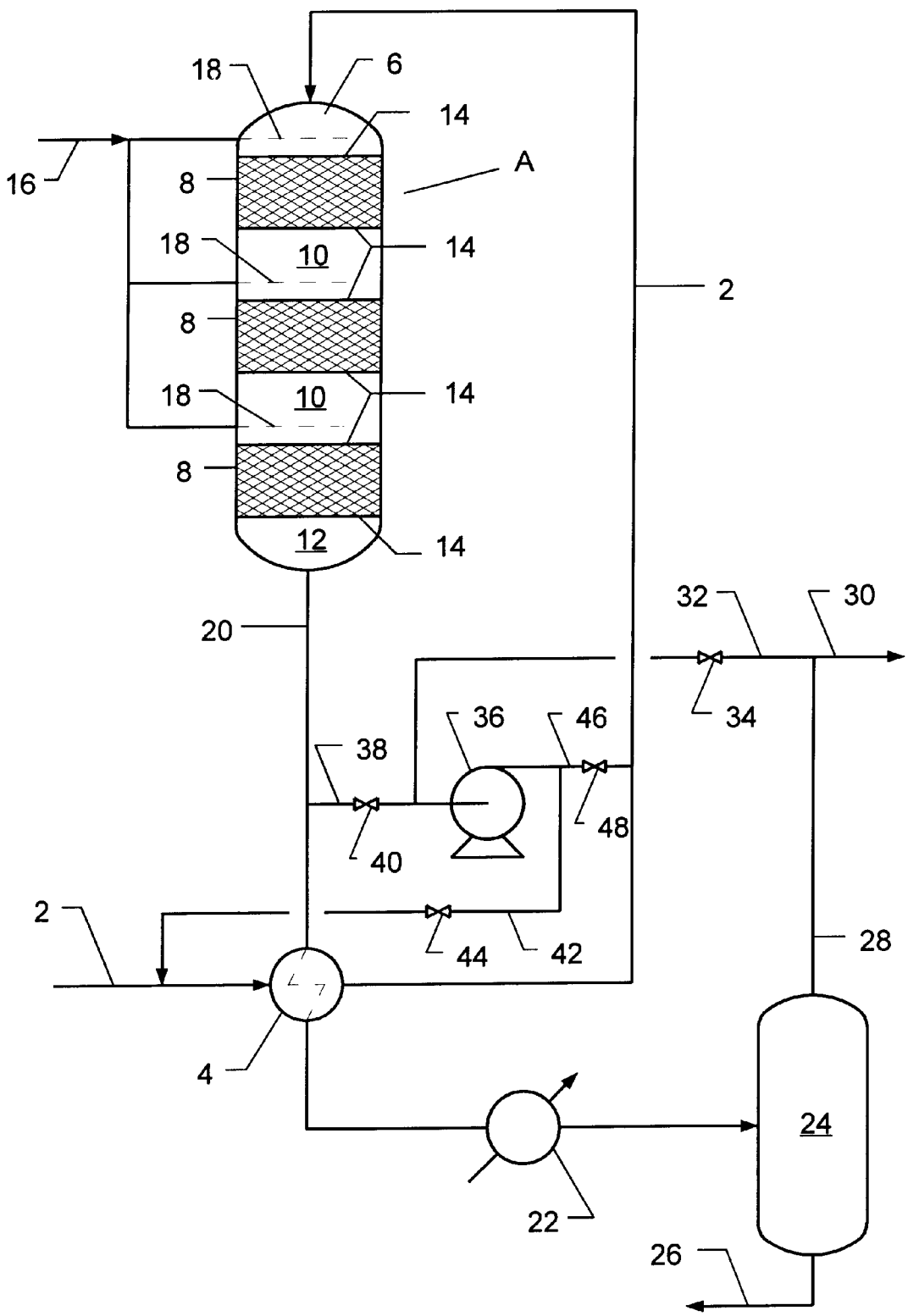

REMOVAL OF NITROGEN OXIDE FROM GAS STREAMS

This is a continuation-in-part of application Ser. No. 08/679,416, filed Jul. 8, 1996 and now abandoned.

FIELD OF THE INVENTION

This invention relates to the removal of nitrogen oxides from gas streams, and more particularly to the removal of high concentrations of nitrogen oxides from carbon dioxide by the catalytic reduction of the nitrogen oxides with ammonia.

BACKGROUND OF THE INVENTION

Gas process or product streams often contain unwanted nitrogen oxides (NOX), the removal of which is desired. For example, combustion waste gases, generally contain large concentrations of carbon dioxide and nitrogen, usually also contain nitrogen oxides due to the slight high temperature oxidation of nitrogen during the combustion process. If it is desired to produce high purity gaseous or liquid carbon dioxide from the waste gas the nitrogen, oxygen, methane, argon and nitrogen oxides must be removed from the waste gas stream. Nitrogen, oxygen, methane and argon can be easily removed from the waste gas by, for instance, distillation, and discharged into the atmosphere, if desired, but the NOX is not easily separated from the carbon dioxide by physical gas separation techniques, nor can it be safely disposed into the environment.

An environmentally acceptable method of removing the NOX from the gas stream is to convert the NOX to nitrogen and then remove the nitrogen from the gas by distillation. This can be accomplished by passing the gas stream over a catalyst at elevated temperatures in the presence of ammonia. The nitrogen oxides are reduced to nitrogen and water vapor, which are subsequently separated from the carbon dioxide. The reaction is highly exothermic; accordingly, if the waste gas contains significant concentrations of NOX, some means of preventing overheating of the catalyst must be employed. This is necessary to prevent inactivation of the catalyst, which occurs at excessively high temperatures. Traditionally, control of the catalyst bed temperature has been accomplished by injecting a stream of air into the gas feed to the NOX reduction reactor. This is not desirable however, when it is desired to recover gas components from the gas stream, because of the need to separate the added air from the desired product.

Because of the importance of removing NOX from gas streams when it is desired to recover certain components of the gas stream, improvements to suitable gas recovery methods are constantly sought. The present invention presents a significant improvement to catalytic NOX reduction operations by providing an efficient solution to the problem of temperature control in the NOX reduction reactor. According to the invention, a portion of the product gas stream exiting the NOX reduction reactor is recycled to the reactor feed.

U.S. Pat. No. 4,718,361 discloses a process in which a fuel is combusted in a furnace with oxygen to produce a carbon dioxide-rich gas. A portion of the carbon dioxide-rich gas is recycled to the feed for mixing with the oxygen, and a portion of cooled carbon dioxide-rich gas is mixed with the combustion gas exiting the furnace to cool the gas.

SUMMARY OF THE INVENTION

In a broad embodiment, the invention comprises an improvement in a process for removing NOX from a gas stream. The process which is improved comprises contacting the gas stream, which contains small amounts of NOX, and ammonia in a reaction zone containing a catalyst which effects the reaction of NOX with ammonia to produce a substantially NOX-free product gas containing nitrogen and water vapor. The improvement comprises recycling preferably continuously a portion of the product gas to the gas stream entering the reaction zone, thereby diluting the NOX in the gas stream sufficiently to prevent the temperature of the gas stream in the reaction zone from rising to the point at which significant deactivation of the catalyst occurs.

In a preferred embodiment of the invention, the gas stream being treated is a carbon dioxide-rich gas, and the process functions to recover carbon dioxide from the carbon dioxide-rich gas. In this embodiment, any sulfur oxides contained in the gas stream are removed prior to contacting the gas stream with the reduction catalyst.

In a preferred aspect of the broad embodiment the product gas exiting the reaction zone is cooled by heat exchange with the gas stream prior to introduction of the gas stream into the reaction zone. In another preferred aspect, moisture is removed from the product gas prior to its recycle to the gas stream.

In another preferred aspect of the broad embodiment, a portion of the product gas is compressed and recycled to said gas stream without cooling the product gas prior to its recycle.

In a preferred aspect of the embodiment in which the feed gas is a carbon dioxide-rich gas stream, the carbon dioxide-rich product gas is dried sufficiently to remove substantially all of the moisture therefrom and high purity carbon dioxide is condensed from the dried product gas.

The process of the invention is particularly useful for treating combustion waste gas streams containing about 0.5 or more mole percent, for example about 0.5 to about 1 mole percent nitrogen oxides.

In a preferred embodiment, the quantity of product gas recycled to the gas stream is sufficient to maintain the temperature rise in said reaction zone below about 70° C. This is particularly desirable when the NOX reduction catalyst is a zeolite/copper catalyst, such as Norton NC-300 catalyst or Wheelabrator Econ-$NO_x$—ZCX1 catalyst.

BRIEF DESCRIPTION OF THE DRAWING

The drawing illustrates, in a block diagram, a system for carrying out a preferred embodiment of the process of the invention.

DETAILED DESCRIPTION OF THE INVENTION

The invention is applicable in processes in which NOX are to be removed from gas streams and it is desired to recover one or more components of the NOX-depleted gas stream. The invention is especially useful for recovering carbon dioxide from gas streams, particularly waste gas streams from combustion processes. Such gas streams are carbon dioxide-rich, being composed substantially of carbon oxides and nitrogen (when air is used as the source of oxygen for the combustion process). and thus constitute good sources of carbon dioxide. Exhaust gas streams from oxy-combustion processes are preferred sources of carbon dioxide because they contain less nitrogen than air-fired combustion processes.

As used in this specification, "NOX" means nitrogen oxides, e.g. nitric oxide, nitrogen dioxide, nitrous oxide, etc.; "SOX" means sulfur oxides, e.g. sulfur dioxide and sulfur trioxide; "carbon dioxide-rich" gases streams are those which contain carbon dioxide in substantial concentrations, e.g. about 25 mole percent or more; "high purity" gas streams or products are those which contain at least 85 mole percent, and more usually at least 90 mole percent carbon dioxide; and NOX-free gas streams or products are those which contain no or very little, e.g. not more than 50 ppm (part per million by volume) NOX, and more usually not more than about 10 ppm NOX.

When the gas stream treated in accordance with the teachings of this invention is a waste gas stream from a combustion process, it usually contains SOX, which results because of the presence of mercaptans and sulfides in the fuel used to fire the combustion process or because of the presence of sulfides or other sulfur-containing compounds in the materials being treated in the combustion process. The SOX are preferably removed from the gas stream being purified by the process of the invention before it is brought into contact with the NOX reduction catalyst, otherwise the catalyst will cause the SOX to react with ammonia to form solid sulfites and sulfates, which will foul and poison the catalyst. The SOX can be removed from the gas stream being purified by adsorption, when the SOX are present in small, e.g. trace concentrations, or by liquid phase scrubbing operations, when the SOX are present in higher concentrations.

The improved process of the invention is useful for controlling the temperature rise in the chamber in which the reaction process is carried out. The process is particularly useful when the catalyst used for the reaction is sensitive to heat flux, e.g. when the catalyst undergoes partial or complete inactivation or degradation when subjected to large temperature differentials. The invention is most effective for protecting the preferred catalysts for the desired reaction, which include the zeolite copper catalysts mentioned above, when they are used at reaction temperatures of about 350° C., or higher. These catalysts often begin to undergo inactivation when the reaction temperature rises significantly, for example about 70° C., during the course of the reaction.

In conducting the improved process of the invention, the NOX-containing gas stream being purified and ammonia are introduced into a gas reaction chamber containing a catalyst which causes the reaction of the NOX and the ammonia to produce nitrogen and water vapor. The reaction chamber may be a single- or multiple zone reactor. The reaction, once initiated, is exothermic, and the temperature in the reaction chamber is dependent upon, inter alia. the concentration of NOX in the gas stream. When the gas stream being treated contains significant concentrations e.g. about 0.5 mole percent or more of NOX, the heat produced in the NOX-ammonia oxidation reduction reaction is significant, and the invention can be employed with great advantage.

The improvement of the invention can be used in any NOX-removal gas purification process in which it is desired to recover components of the gas stream being purified. However, since it is particularly useful in processes in which it is desired to recover carbon dioxide from gas streams, it will be described in detail as applied to such processes. U.S. patent application Ser. No. 518,380, filed Aug. 23, 1995, discloses a selective catalytic reduction process for converting NOX in gas streams to nitrogen by reaction with ammonia. The text of this patent application is incorporated herein by reference. A more thorough understanding of the invention can be attained from the drawing, which illustrates two preferred embodiments of the invention.

Turning now to the drawing, illustrated therein is a system comprising a multistage NOX reduction reactor, A, a gas-liquid separator 24 and several heat exchangers, gas blowers, flow lines and valves. Feed gas line 2 connects a source of carbon dioxide-rich gas, such as the exhaust gas from a combustion process (not shown) to system illustrated in the drawing. Inlet line 2 passes through heat exchanger 4 and is connected to gas inlet chamber 6 of reactor A. Reactor A is depicted as containing, in addition to gas inlet chamber 6, three catalyst beds 8, which are separated by intermediate chambers 10, and gas exit chamber 12, which is located beneath the lowermost catalyst bed. Catalyst beds 8 are held in place by screens 14, located above and below each catalyst bed. Ammonia gas supply line 16 connects a source of ammonia (not shown) to ammonia distributors 18, positioned in inlet chamber 6 and intermediate chambers 10.

The upstream end of purified gas discharge line 20 is connected to chamber 12. Line 20 passes through heat exchanger 4 and condenser 22 and is connected to vapor-liquid separator 24. Separator 24 is provided with a condensed water discharge line 26 and with dewatered product gas discharged line 28, which is connected to product gas line 30 and cool gas recycle line 32. Line 32, which is fitted with valve 34, is connected at its downstream end to the inlet end of gas blower 36. Hot gas recycle line 38, fitted with valve 40, joins line 20 to line 32. Line 42, which is provided with valve 44, connects the outlet end of blower 36 to feed line 2 upstream of heat exchanger 4. Hot gas bypass line 46, fitted with valve 48 joins line 42 to line 2, between heat exchanger 4 and reactor A.

In practicing one embodiment of the process of the invention in the system illustrated in the drawing, valves 34 and 44 are open and valves 40 and 48 are closed. Feed gas from any source, such as an oxygen-fired glass furnace, enters the system through line 2. If the feed gas contains impurities, such as SOX and fine particulate solids, these are removed upstream of the system in pretreatment operations. As the feed gas enters the system it generally contains about 0.5 to about 1 mole percent NOX. In startup operations, the feed gas is heated to the desired reaction temperature by appropriate heating means (not shown). During normal steady-state operations the feed gas is heated to the reaction temperature as it passes through heat exchanger 4, wherein it is heated by the product gas stream leaving reactor A. The heated feed gas enters into chamber 6 of reactor A, wherein it mixes with gaseous ammonia, which is introduced into the system through line 16 and upper gas distributor 18. The feed gas-ammonia mixture next passes through the first catalyst bed, and as it does so a portion of the NOX and ammonia are converted to nitrogen and water vapor. The gas mixture next enters the first intermediate chamber, wherein it is mixed with additional ammonia introduced into this chamber through center distributor 18. The ammonia-enriched mixture then passes through the second catalyst bed, wherein additional NOX and ammonia are converted to nitrogen and water vapor. The mixture then enters the next intermediate chamber, wherein it mixes with ammonia entering this chamber through lower distributor 18. The total amount of ammonia introduced into reactor A is slightly greater than the stoichiometric amount required to convert all of the NOX in the gas stream to nitrogen and water vapor.

The hot product gas leaves reactor A through line 20 and passes through heater 4 wherein it is cooled by the cool incoming feed gas. The cooled product gas next passes through condensing cooler 22, wherein it is cooled sufficiently to condense water vapor in the product gas. The gas-water mixture then passes into separator 24 where the product gas is separated from the aqueous condensate. The water, together with excess ammonia, which has been dissolved from the product gas by the condensing water vapor, passes out of separator 24 through line 26 and is disposed of in any suitable manner. The product gas, now comprised substantially of carbon dioxide, leaves separator 24 through line 28 and passes to downstream processing operations through product gas discharge line 30. If it is desired to remove additional moisture from the product gas, which is usually the case when the carbon dioxide is to be liquefied, this can be accomplished by passing the product gas from separator 24 through gas driers (not shown), after compression to liquefaction pressure.

In this embodiment of the system illustrated in the drawing, a portion of the dried product gas leaving separator 24 passes through cool gas recycle line 32 and blower 30, wherein it is pressurized to the pressure of the feed gas in line 2. The pressurized recycle gas then enters line 2 where it mixes with fresh feed gas. Adequate product gas is recycled to the feed gas through to dilute the NOX in the feed sufficiently to prevent the heat of reaction from raising the temperature in reactor A more than about 70° C.

In an alternate embodiment of the invention practiced in the system illustrated in the drawing, valves 34 and 36 is closed, and valves 40 and 48 are open. In this embodiment the desired quantity of hot gas is recycled to the reactor through line 38, blower 36 and lines 46 and 2, and all of the product gas from separator 24 passes to downstream processing through line 30. This embodiment is preferred over the above-described embodiment because it more efficiently uses the heat of reaction and minimizes or eliminates entirely the need for supplemental heat to attain the desired result.

The invention is illustrated in the following hypothetical example in which parts, percentages and ratios are expressed on a volume basis, unless otherwise indicated.

EXAMPLE

In this example, 100 normal cubic meters per minute of an exhaust gas from an oxy-fuel combustion furnace at a temperature of about 350° C. and comprised of 99.21% by volume carbon dioxide and inerts and 0.79% mixed nitrogen oxides is passed through a three-stage selective catalytic reactor of the type illustrated in the attached figure. The reactor contains three beds of Norton NC-300 zeolite/copper catalyst. Sufficient ammonia is introduced into the reactor to convert all of the nitrogen oxides in the exhaust gas to nitrogen and water vapor. The system is first operated without recycling any of the gaseous reactor effluent to the reactor. The temperature rise in the reactor will be about 100° C.

When the above procedure is repeated but with recycle of 35% of the hot effluent from the reactor to the feed stream to the reactor, the temperature rise in the reactor will be maintained below about 70° C.

The above example illustrates temperature control in nitrogen oxide waste gas reactor without dilution of the components of the waste gas.

Although the invention is described with particular reference to specific gas compositions and equipment arrangements, it is understood that the invention is not limited to these features. For example, flow of the process gas through the NOX reduction reactor can be upwardly, or the reactor can be arranged in the horizontal position. The scope of the invention is limited only by the breadth of the appended claims.

What is claimed is:

1. In a process for removing NOX from a gas stream containing the NOX as an impurity comprising contacting the gas stream and ammonia in a reaction zone containing a catalyst which effects the reaction of NOX with ammonia to produce a product gas containing nitrogen and water vapor, the improvement comprising continuously recycling a portion of the product gas to the gas stream thereby diluting the NOX in the gas stream sufficiently to prevent the temperature of the gas stream in the reaction zone from rising to the point at which significant deactivation of the catalyst occurs at any time during the process.

2. The process of claim 1 wherein the gas stream comprises carbon dioxide.

3. The process of claim 2, wherein the gas stream is the exhaust gas from a combustion process.

4. The process of claim 3, wherein said exhaust gas additionally contains sulfur oxides, and these are removed from said gas stream prior to its introduction into said reaction zone.

5. The process of claim 1, wherein said product gas exiting said reaction zone is cooled by heat exchange with said gas stream prior to introduction of the gas stream into said reaction zone.

6. The process of claim 1, wherein moisture is removed from said product gas prior to its recycle to said gas stream.

7. The process of claim 1, wherein a portion of said product gas is compressed and recycled to said gas stream prior to cooling of said product gas.

8. The process of claim 2, wherein said product gas is dried sufficiently to remove substantially all of the moisture therefrom and carbon dioxide is condensed from the dried product gas.

9. The process of claim 1, wherein said gas stream contains at least 0.5 mole percent NOX.

10. The process of claim 2, wherein the concentration of NOX in said gas stream is in the range of about 0.5 to about 1 mole percent.

11. The process of claim 1, wherein the quantity of product gas recycled to said gas stream is sufficient to maintain the temperature rise in said reaction zone below about 70° C.

12. The process of claim 1 wherein said catalyst is a zeolite copper catalyst.

\* \* \* \* \*